April 9, 1968 D. W. McCULLOCH 3,376,625
METHOD OF MAKING FLUID PULSATION DAMPENERS
Filed July 19, 1965
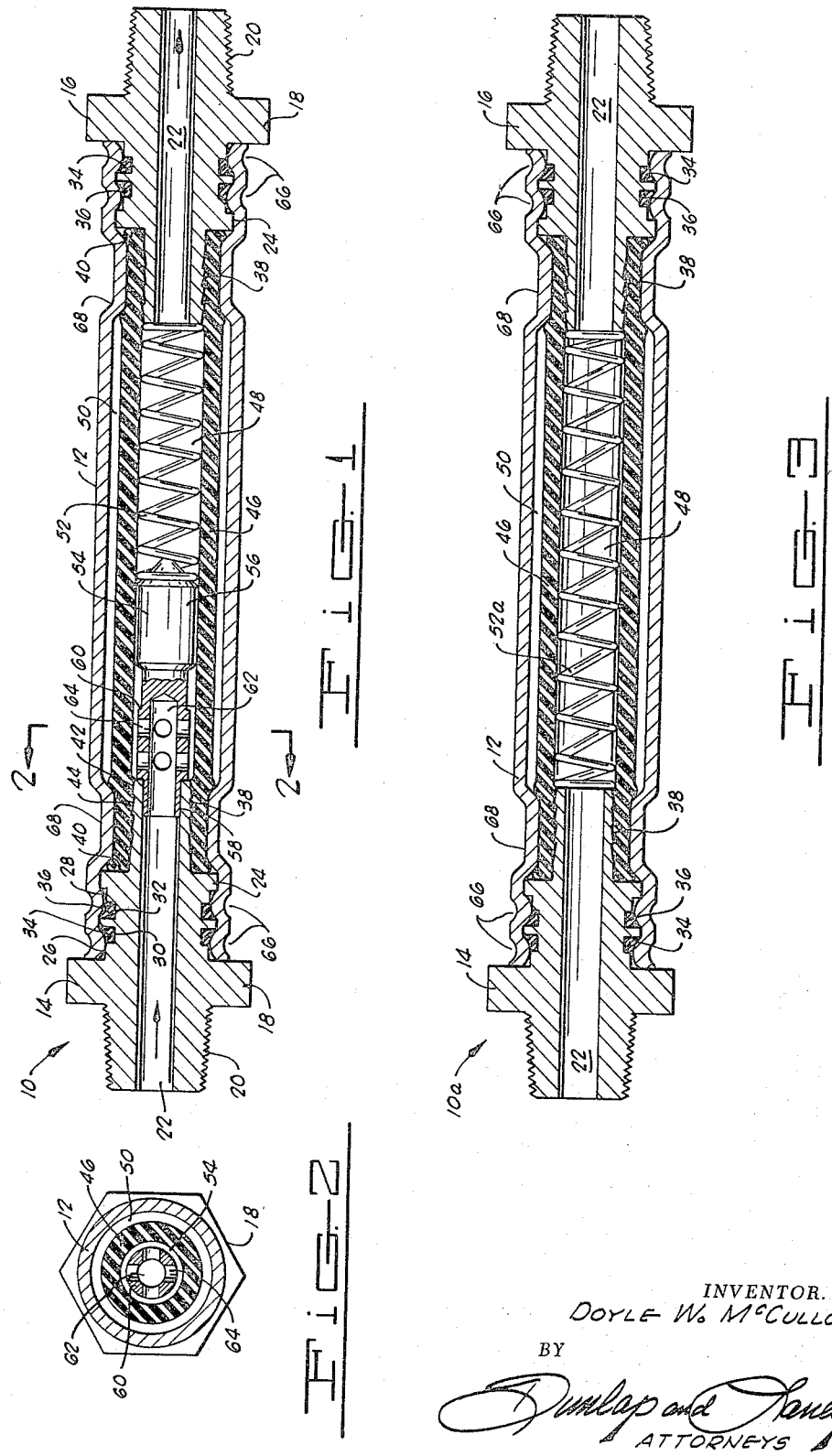
INVENTOR.
DOYLE W. McCULLOCH
BY
Dunlap and Haney
ATTORNEYS

United States Patent Office 3,376,625
Patented Apr. 9, 1968

3,376,625
METHOD OF MAKING FLUID PULSATION DAMPENERS
Doyle W. McCulloch, Blackwell, Okla., assignor to Mac/Bee Engineering Inc., Garland, Tex., a corporation of Texas
Filed July 19, 1965, Ser. No. 472,842
6 Claims. (Cl. 29—157)

This invention relates generally to improvements in pulsation damping devices. More particularly, but not by way of limitation, this invention relates to an improved pulsation damper for use in fluid circuits to modulate the amplitude of pressure surges or pulses in the fluid flowing through the damper.

Many different types of pulsation dampers have been constructed in the past and most have operated with some degree of success. The most common type of pulsation damper previously constructed includes a hollow body having one end arranged for connection with the fluid circuit and having the other end closed. A resilient diaphragm is positioned in the hollow body, extending across the opening therein, to form a chamber adjacent the closed end. Some means, such as a valve, is generally provided in the hollow body for introducing a compressible gas into the chamber. Pulsation dampers of this type do not permit flow therethrough and are, therefore, installed in a "dead-end" position in the fluid circuit.

Generally, such an arrangement functions satisfactorily to alleviate pulsations in the circuit, however, some fluid is trapped in the damper. The result of trapping the fluid is that contamination occurs when a different fluid is pumped through the circuit.

Other pulsation dampers have been constructed that become a portion of the fluid circuit and permit fluid flow therethrough. Such methods of making pulsation dampers alleviate or avoid the problem of entrapment of fluid therein. Method of making pulsation dampers of this type generally include an exterior housing arranged at each end for connection with the fluid circuit and an interior resilient tube arranged concentrically within the exterior housing to form an annular chamber therebetween. A pressurized, compressible gas is introduced into the chamber through a valve connected to an opening in the exterior housing so that the damper can be used effectively with relatively high pressures. However, it has proved to be extremely difficult to maintain the gas under pressure in the chamber, primarily due to leakage through the valve. If the gas in the chamber loses its pressure, the damper becomes ineffective to modulate the pulsations of fluid flowing therethrough, except when fluids in the circuit are at extremely low pressures.

In one aspect, this invention provides an improved pulsation damper that includes: a tubular body connected at each end with a hollow fitting, whereby the damper can be connected in the fluid circuit; a resilient tubular member disposed within the tubular body, forming an annulus therewith and engaging the hollow fittings to form a flow passageway through the damper; and, a compressible fluid in the chamber formed between the tubular member and tubular body for absorbing a portion of the pulsating energy of the fluid flowing through the damper to modulate such pulsations.

In another aspect, this invention provides a novel method of constructing a pulsation damper that broadly includes the steps of: placing a hollow fitting in engagement with each end of a pair of telescopically arranged hollow members; forming a fluid-tight seal between the outer member of the hollow members and the hollow fittings; and, introducing a pressurized fluid between said hollow members to absorb the pulsating energy of fluid flowing therethrough.

A still further object of the invention is to provide an improved method of manufacturing a pulsation damper wherein the compressible fluid is trapped in the damper during the manufacture thereof.

The foregoing and additional objects and advantages of the invention will become more apparent as the following detailed description is read in conjunction with the accompanying drawings wherein like reference characters denote like parts in all views and wherein:

FIG. 1 is a cross-sectional view of a pulsation damper constructed in accordance with the invention;

FIG. 2 is a transverse, cross-sectional view of the pulsation damper of FIG. 1, taken substantially along the line 2—2 of FIG. 1; and FIG. 3 is a cross-sectional view of another embodiment of pulstion damper also constructed in accordance with the invention.

*Embodiment of FIG. 1*

FIG. 1 illustrates a pulsation damper generally designated by the reference character 10 and constructed in accordance with the invention. As shown therein, the pulsation damper 10 includes a hollow body 12 having each end connected with a hollow fitting 14 and 18.

The hollow fittings 14 and 16 are identical in construction and, therefore, only the fitting 14 will be described in detail. The fitting 14 includes a hexagonal flange 18 (see FIG. 2) arranged to be engaged by a wrench or other device for connecting the pulsation damper 10 in a fluid circuit (not shown). The outer end of the fitting 14 is provided with threads 20 for threadedly attaching the pulsation damper 10 in the fluid circuit (not shown). A passageway 22 extends through the fitting 14.

The fitting 14 also includes a portion 24 of reduced diameter on the opposite side of the flange 18 to the threads 20. A pair of spaced, recesses 26 and 28 are formed in the portion 24 of reduced diameter. The recess 26 includes an annular groove 30 and the recess 28 includes an annular groove 32. The annular grooves 30 and 32 are each sized to receive annular resilient seals 34 and 36, respectively. The seals 34 and 36 may conveniently be commercially available O-rings.

A second portion 38, also of reduced diameter, is formed on the fitting 14 forming a shoulder 40 with the portion 24. As illustrated in FIG. 1, the exterior of the second portion 38 is provided with a plurality of lands and grooves 42 and 44, respectively, to more securely retain a resilient tubular member 46 thereon.

The resilient tubular member 46 has an interior 48 sized to be closely received by the second portion 38 of the fitting 14. The interior 48 and the passageways 22 in the fittings 14 and 16 form a fluid passageway extending through the pulsation damper 10.

The pulsation damper 10 is preferably assembled with the ends of the tubular member 46 in engagement with the shoulders 40 on the fittings 14 and 16. The outside diameter of the tubular member 46 is less than the inside diameter of the hollow body 12 so that the tubular member 46 and the hollow body 12 form an annular chamber 50 when assembled in the pulsation damper 10. The tubular member 46 is constructed from a resilient material that is impermeable and impervious to the material flowing through the pulsation damper 10.

The chamber 50 is filled with a compressible fluid (not shown), such as air or nitrogen in the gaseous state. The method used for filling the chamber 50 will be described more fully hereinafter.

A coil member 52 is positioned in the interior of the tubular member 46 with one end in engagement with the end fitting 16 and the other end in engagement with a restriction member 54. The coil member 52 may be suitably constructed from a spring having an outside diameter substantially the same as the inside diameter of the tubular member 46.

The restriction member 54 has an enlarged end 56 that is of a diameter substantially the same as the inside diameter of the tubular member 46 and has a second end 58 that is sized to be tightly received in the passageway 22 extending through the end fitting 14. If desired, the restriction member 54 may be constructed as an integral portion of the end fitting 14.

A medial portion 60 of the restriction member 54 is reduced slightly in diameter with respect to the end 56. The second end 58 of the rstriction member 54 has a bore 62 extending therethrough and into the medial portion 60. The bore 62 is in communication with the passageway 22 in the fitting 14 and, through a plurality of ports 64 that extend through the medial portion 60, in communication with the interior 48 of the tubular member 46.

As previously mentioned, the annular chamber 50 is filled with a compressible gas (not shown). It is important to note that no external valve or other means is illustrated as being connected with the hollow body 12 to permit the introduction of the compressible gas into the annular chamber 50.

To construct the pulsation damper 10, the restriction member 54 is inserted in the end of the fitting 14 and the tubular member 46 slipped over the reduced portion 38 of the fitting 14 and over the restriction member 54. Next, the coil member 52 is inserted in the tubular member 46 until the end thereof engages the end 56 of the restriction member 54. The hollow body 12 is then slipped over the tubular member 46 and over the reduced portion 24 of the fitting 14. The fitting 16 is assembled with the portion 24 of reduced diameter thereon disposed within the hollow body 12 and with the reduced portion 38 thereon inserted into the interior 48 of the tubular member 46.

After the various components of the pulsation damper 10 have been assembled, the ends of the hollow body 12 are deformed, such as by rolling, as illustrated at 66. Deforming the ends inwardly at 66, forces the seals 34 and 36 into sealing engagement with the end fittings 14 and 16 and with the hollow body 12, forming a fluid-tight connection therebetween.

While the hollow body 12 is perferably connected with the fittings 14 and 16 by the deformations 66, other methods of connecting the body 12 in fluid-tight engagement wtih the fittings 14 and 16 will be readily apparent to those skilled in the art. For example, the ends of the hollow body 12 can be welded to the fittings 14 and 16 eliminating the necessity for the seals 34 and 36. However, the tubular member 46 must be cooled during the welding process to avoid damage thereto. Also, the interior of the hollow body 12 can be threadedly connected with the fittings 14 and 16 if appropriate threads are provided thereon.

One end of the pulsation damper 10 is then closed, blocking the passageway 22 in either the fittings 14 or 16. A source of compressible gas (not shown) is connected to the open fitting, 14 or 16, of the pulsation damper 10 and the compressible gas introduced through the pasageway 22 of the open fitting into the interior 48 of the tubular member 46. The compressible gas forces the tubular member 46 relatively outwardly and away from the reduced portions 38 of the fittings 14 and 16 so that the gas flows between the reduced portions 38 and the tubular member 46 into the annular chamber 50. After the desired quantity and pressure of gas has been introduced therein, the source of gas (not shown) is removed, or at least the pressure within the interior 48 of the tubular member 46 is decreased, whereupon the compressible gas in the ann˜lar chamber 50 exerts a force on the tubular member 46, forcing it into sealing engagement with the reduced portions 38 of the fittings 14 and 16 and thereby trapping the compressible gas in the annular chamber 50.

To complete the manufacture of the pulsation damper 10, the hollow body 12 is then deformed at 68 into engagement with the tubular member 46. The deformation is sufficiently great so that the ends of the tubular member 46 are held in fluid-tight engagement with the reduced portions 38 of the fittings 14 and 16 and with the hollow body 12. Thus, it can be seen that the compressible gas is permanently trapped in the annular chamber 50. Since the compressible gas is permanently trapped in an annular chamber 50, it is not necessary to provide the hollow body 12 with any type of device, such as a valve, for filling the chamber 50 with the gas.

Several variations in the procedure for constructing the pulsation damper 10 will be apparent to those skilled in the art. For example, instead of releasing the pressure in the interior 48 of the tubular member 46, the pressure may be held while the hollow body 12 is deformed at 68 and the same effect is achieved, that is, the desired pressure of compressible gas is entrapped in the annular chamber 50.

*Operation of the embodiment of FIG. 1*

In operation, the fittings 14 and 16 of the pulsation damper 10 are connected in a fluid circuit (not shown) so that fluid flows through the pulsation damper in the direction indicated by the arrows in FIG. 1. As can be seen in FIG. 1, fluid flowing into the passageway 22 of the fitting 14, enters the bore 62 of the restriction member 54 flowing outwardly therefrom through the ports 64 into the interior 48 of the tubular member 46. If the pressure in the passageway 22 is sufficiently high, the tubular member 46 is deformed outwardly against the pressure exerted by compressible gas in the annular chamber 50, flowing by the restriction member 54 and out of the pulsation damper 10 through the passageway 22 in the fitting 16.

If the fluid is pulsating such as is true when the fluid circuit includes a reciprocating pump, the pulses exert a force of varying magnitude on the tubular member 46. The compressible gas in the annular chamber 50 absorbs a portion of the energy of such pulsations, thereby modulating the magnitude of the pulsations so that the fluid flowing out of the pulsation damper 10 is at a more nearly constant pressure. It should also be pointed out, that the restriction member 54, particularly the enlarged end 56 thereon, offers some restriction to fluid flow through the pulsation damper 10 until the pressure of fluid flowing therethrough is sufficiently high to deform the tubular member 46 relatively away from the restriction member 54. When this occurs, the resistance to fluid flow through the pulsation damper 10 is, for all practical purposes, eliminated.

While the preferred direction of flow through the pulsation damper 10 is in the direction indicated by the arrows in FIG. 1, the pulsation damper 10 will function when the flow therethrough is in the opposite direction. However, it has been found that there is some tendency for the tubular member 46 to move, under the influence of the gas, into engagement with the medial portion 60 of the restriction member 54, blocking or partially restricting the ports 64 when the fluid is flowing from the fitting 16 to the fitting 14.

*Embodiment of FIG. 3*

FIG. 3 illustrates a simplified version of the pulsation damper 10 shown in FIGS. 1 and 2, generally designed by the reference character 10a. As may be readily perceived from viewing FIG. 3 the only difference between the pulsation damper 10a and the pulsation damper 10 is the omission of the restriction member 54 from the pulsation damper 10a and the extension of the coil member 52, that is designated as 52a in FIG. 3, to extend from the end of the fitting 14 to the end of the fitting 16 within the tubular member 46.

The pulsation damper 10a also includes the hollow body 12 connected with the fittings 14 and 16 by the deformations 66 that form a fluid-tight seal with the seals 34 and 36 as described in connection with the embodiment of FIG. 1. Also, it will be noted in FIG. 3 that the end of the tubular member 46 are restrained by the deformations 68 of the hollow body 12, forming a fluid-tight closure with the tubular member 46 and the reduced portions 38 of the fittings 14 and 16. Also, as previously described, the outside diameter of the tubular member 46 is smaller than the inside diameter of the hollow body 12 to form the annular chamber 50 therebetween.

A compressible gas is entrapped in the annular chamber 50 during the manufacture of the pulsation damper 10a as described in connection with the manufacture of the pulsation damper 10.

*Operation of the embodiment of FIG. 3*

With the pulsation damper 10a connected in a fluid circuit (not shown) fluid in the circuit flows through the passageway 22 in the fittings 14 and 16 and through the interior 48 in the tubular member 46. As the fluid surges, due to pressure pulsations therein, the tubular member 46 is deformed relatively outwardly compressing the gas in the annular chamber 50. As such pulsations occur, the compressible gas in the annular chamber 50 absorbs a portion of the energy therefrom, thereby modulating the magnitude of the pulses.

The coil members 52 and 52a, illustrated in FIGS. 1 and 3, function to prevent the inward deformation of the tubular member 46 under the influence of the compressible gas in the annular chamber 50 when the pressure in the interior 48 thereof is at a reduced value. The provision of the coil members 52 and 52a are effective to support the tubular member 46 without entrapping any fluid in the pulsation damper 10 or 10a that could comingle with and thus contaminate different fluids which are subsequently pumped through the circuit (not shown).

If desired, the pulsation dampers 10 or 10a can be constructed omitting both the restriction member 54 and the coil members 52 and 52a. However, with such a construction the compressible gas in the annular chamber 50 deforms the tubular member 46 relatively inwardly thereby restricting the flow through the pulsation damper.

Also, the extreme deformation of the tubular member 46, when no coil member is utilized, may result in a shortened life span for the tubular member 46.

From the foregoing detailed description, it can be appreciated that pulsation dampers constructed in accordance with the invention can be installed in a fluid circuit to effectively modulate pulses occuring therein and will not entrap fluids which may contaminate subsequent fluids passed through the circuit. Also, little or no maintenance will be necessary on the pulsation dampers due to the permanent entrapment of the compressible gas in the annular chamber 50. Furthermore, the pulsation dampers may be quickly, easily and economically manufactured by the method described in detail hereinbefore.

The embodiments described hereinbefore are presented by way of example only and it should be understood that many changes and modifications can be made thereto without departing from the spirit of the invention or from the scope of the annexed claims.

What I claim is:

1. A method of manufacturing a pulsation damper comprising the steps of:
   placing a hollow fitting in engagement with each end of a pair of telescopically arranged hollow members;
   forming a fluid-tight seal between the outer member of said hollow members and said fittings; and
   introducing a pressurized fluid into the interior of the inner hollow member of said hollow members and between said inner hollow member and said fittings, whereby said fluid enters the space between said hollow members.

2. A method of manufacturing a pulsation damper comprising the steps of:
   placing a hollow fitting in engagement with each end of a pair of telescopically arranged hollow members;
   forming a fluid-tight seal between the outer member of said hollow members and said fittings;
   introducing a pressurized compressible fluid between the inner hollow member of said hollow members and said fittings and into the space between said hollow members; and
   forming a fluid-tight seal between said hollow members and said fittings to trap said fluid between said hollow members.

3. A method of manufacturing a pulsation damper comprising the steps of:
   placing a hollow fitting in engagement with each end of a pair of telescopically arranged hollow members;
   forming a fluid-tight connection between the outer member of said telescopically arranged hollow members and said fittings;
   introducing a pressurized compressible fluid into the interior of the inner member of said hollow members and between said inner hollow member and said fittings whereby fluid enters the space between said hollow members; and
   forming a fluid-tight connection between the hollow members and said fittings to trap said fluid in said space.

4. A method of manufacturing a pulsation damper comprising the steps of:
   placing a hollow fitting in engagement with each end of a pair of concentrically arranged tubular members;
   forming a fluid-tight connection between the outer member of said concentrically arranged tubular members;
   introducing a pressurized compressible fluid into the interior of the inner member of said pair of concentrically arranged tubular members and between said inner member and said fittings whereby said fluid enters an annular space between said tubular members; and
   forming a fluid-tight connection between said concentrically arranged tubular members and each of said fittings to trap said fluid between said tubular members.

5. A method of manufacturing a pulsation damper comprising the steps of:
   placing a resilient tubular member within a tubular body;
   placing a hollow fitting in each end of said tubular member;
   forming a fluid-tight connection between said fittings and tubular body;
   introducing a pressurized compressible fluid into the interior of said tubular member and between said tubular member and fittings whereby said fluid enters an annular space between said tubular member and tubular body; and
   forming a fluid-tight connecttion between said fittings, and the tubular member, and tubular body to trap said fluid in said annular space.

6. A method of manufacturing a pulsation damper comprising the steps of:
   placing a resilient tubular member within a tubular body;
   placing a hollow fitting in each end of said tubular member;
   forming a fluid-tight seal between each of said fittings and said tubular body;
   introducing a pressurized compressible fluid into the interior of said tubular member and between said tubular member and fittings whereby said fluid enters an annular space between said tubular member and tubular body;
   releasing the pressure from the pressurized fluid in said tubular member to trap said fluid in said annular space; and forming a fluid-tight connection between said tubular body, tubular member, and fittings.

References Cited
UNITED STATES PATENTS

| | | | |
|---|---|---|---|
| 1,579,891 | 4/1926 | Sanzoz | 138—30 |
| 2,261,948 | 11/1941 | Beach | 138—30 |
| 2,760,518 | 8/1956 | Peet | 138—30 |
| 2,666,979 | 1/1954 | Van Dusen | 29—455 |
| 2,761,536 | 9/1956 | Bradley | 29—421 X |

FOREIGN PATENTS 393,875   6/1933   Great Britain.

CHARLIE T. MOON, *Primary Examiner*.